US008676997B2

(12) United States Patent
Rapo

(10) Patent No.: US 8,676,997 B2
(45) Date of Patent: *Mar. 18, 2014

(54) SYSTEM AND METHOD FOR UNITIZED MANEUVERS FOR MULTI-PLAYER GAMES

(75) Inventor: Andrew Rapo, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 764 days.

This patent is subject to a terminal disclaimer.

(21) Appl. No.: 12/586,691

(22) Filed: Sep. 24, 2009

(65) Prior Publication Data

US 2011/0072072 A1 Mar. 24, 2011

(51) Int. Cl.
G06F 15/16 (2006.01)
(52) U.S. Cl.
USPC .............. 709/228; 709/203; 463/39; 463/42
(58) Field of Classification Search
None
See application file for complete search history.

(56) References Cited

U.S. PATENT DOCUMENTS

| | | | | |
|---|---|---|---|---|
| 6,699,125 B2 * | 3/2004 | Kirmse et al. | ................... | 463/42 |
| 7,490,169 B1 * | 2/2009 | Ogdon et al. | ................. | 709/248 |
| 7,695,370 B2 * | 4/2010 | Liu et al. | .......................... | 463/42 |
| 7,803,054 B1 * | 9/2010 | Ogus et al. | ...................... | 463/42 |
| 7,843,876 B2 * | 11/2010 | Holt et al. | ...................... | 370/329 |
| 7,914,381 B2 * | 3/2011 | Blythe et al. | .................... | 463/42 |
| 8,024,434 B2 * | 9/2011 | Hutcheson et al. | ........... | 709/221 |
| 8,069,258 B1 * | 11/2011 | Howell | ........................ | 709/230 |
| 8,082,501 B2 * | 12/2011 | Leahy et al. | ................. | 715/706 |

* cited by examiner

Primary Examiner — Mohamed Ibrahim
(74) Attorney, Agent, or Firm — Farjami & Farjami LLP

(57) ABSTRACT

There is provided a system and method for facilitating unitized maneuvers for a shared environment to mitigate the effects of network latency. There is provided a method for use by a processor of a server for facilitating unitized maneuvers for a shared environment, the method comprising receiving a first message generated by a first client of a plurality of clients in response to the first client initiating a first unitized maneuver on a first object for rendering the shared environment and sending a second message to a second client of the plurality of clients in response to receiving the first message to communicate the first unitized maneuver so as to cause the second client to render the first object executing the first unitized maneuver in the shared environment approximately synchronously with the first client until a first end time determinable using parameters of the first unitized maneuver.

20 Claims, 4 Drawing Sheets

SYSTEM AND METHOD FOR UNITIZED MANEUVERS FOR MULTI-PLAYER GAMES

BACKGROUND OF THE INVENTION

1. Field of the Invention

The present invention relates generally to interactive entertainment. More particularly, the present invention relates to multi-player interactive entertainment.

2. Background Art

Interactive entertainment such as video games often reward fast reflexes and quick thinking. For example, shooting games reward players that can quickly recognize and accurately aim at targets, racing games reward players that can quickly react to changing course conditions and rival vehicles, and puzzle games reward players that can analyze the situation and plan several steps ahead. Often, video games are rendered more enjoyable by playing them competitively or cooperatively in a multi-player online setting. In this manner, users can enjoy the thrills of competing in ranked matches and the camaraderie of struggling towards a common goal.

Unfortunately, when using a multi-player online setting, the technical problem of network latency must be addressed. High-speed action genres such as shooting, racing, and puzzle games require fast and smooth game responsiveness to user input for an optimal user experience. However, adding online network based multi-player support requires tolerance of some network latency, rendering it impossible to fully synchronize player states without a time delay or "lag." If synchronization is prioritized, then the time delay may be constrained by the slowest client network connection, causing a potentially large delay between a user input and a game response.

This large time delay is unacceptable for high-speed multi-player action games, which has led to the development of latency compensation and interpolation algorithms to provide better client responsiveness when synchronization data is not yet available. By attempting to estimate or interpolate the changed states of other clients in advance, client systems can immediately respond to user input without waiting for synchronization, thus providing faster game responsiveness. However, this estimation is not always accurate and may lead to distortions in the game.

For example, a client may appear to be winning an online race if interpolation algorithms estimate that rival clients are not yet caught up to the client. However, once the client finally receives the synchronization data from the network server, the reality might be that another rival client already overtook the client and won during the time delay or "lag." Thus, the sweet victory that seemed to be within the client's grasp appears to be unfairly and arbitrarily denied due to the rival client suddenly winning after the synchronization data is received.

These distortions resulting from latency compensation errors are particularly troublesome for high-speed applications requiring frequent synchronization, such as action games. Users may therefore feel less enjoyment from multi-player online action games due to perceived unfair or arbitrary outcomes resulting from inaccurate latency compensation.

Accordingly, there is a need to overcome the drawbacks and deficiencies in the art by creating a way to integrate high-speed action elements in a multi-player game that can nevertheless mitigate the distorting effects of network latency compensation.

SUMMARY OF THE INVENTION

There are provided systems and methods for facilitating unitized maneuvers for a shared environment to mitigate the effects of network latency, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for facilitating unitized maneuvers for a shared environment to mitigate the effects of network latency. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
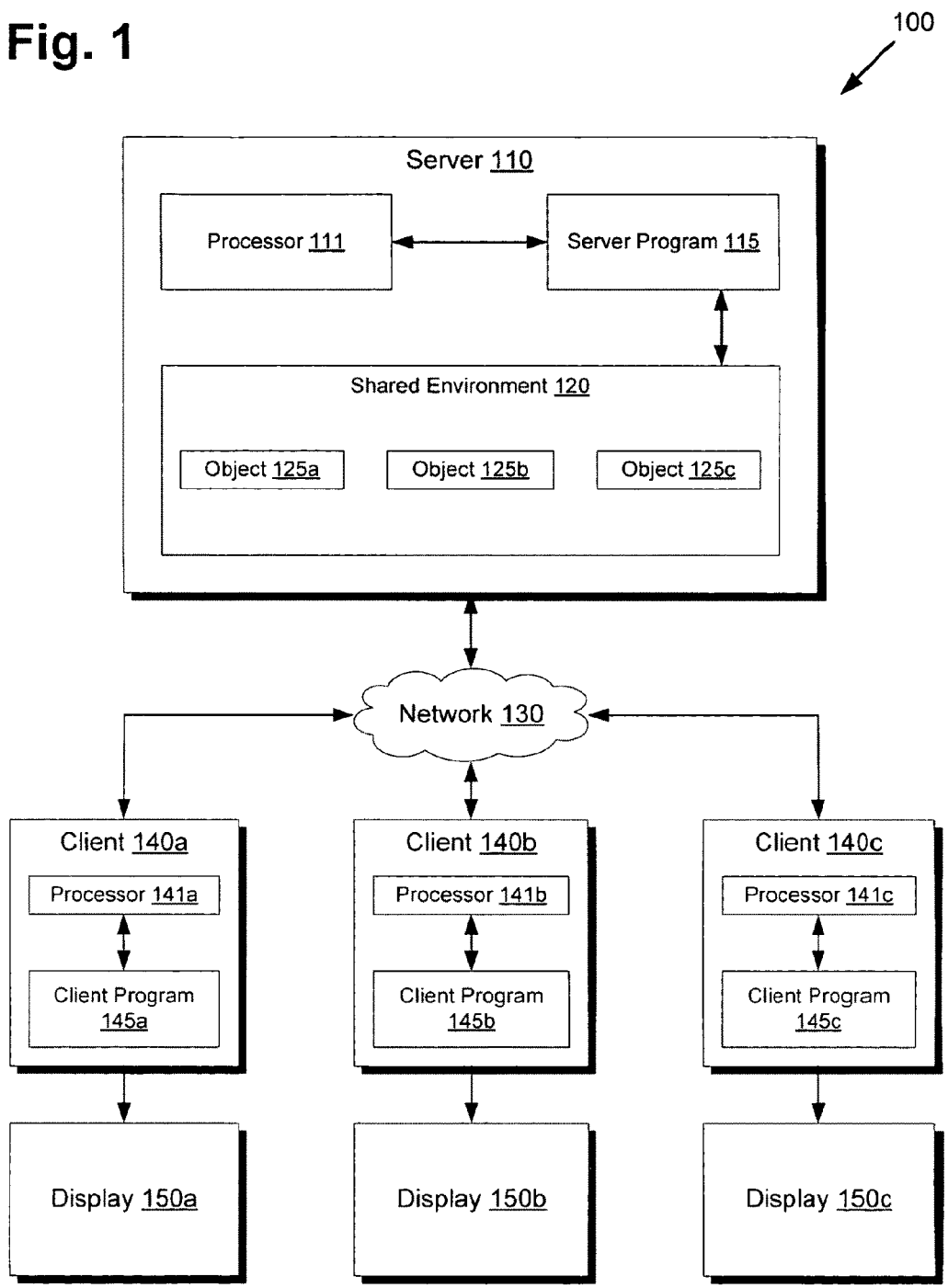
FIG. 1 presents a server facilitating unitized maneuvers for a shared environment, according to one embodiment of the present invention.

FIG. 1 presents a server facilitating unitized maneuvers for a shared environment, according to one embodiment of the present invention. Diagram 100 of FIG. 1 includes server 110, network 130, clients 140a-140c, and displays 150a-150c. Server 110 includes processor 111, server program 115, and shared environment 120. Shared environment 120 includes objects 125a-125c. Client 140a includes processor 141a and client program 145a. Client 140b includes processor 141b and client program 145b. Client 140c includes processor 141c and client program 145c.

FIG. 1 presents an overview of an exemplary network for supporting an online interactive application. As shown in FIG. 1, clients 140a-140c each connect to server 110 via network 130. Network 130 may comprise a publicly accessible network such as the Internet. Processor 111 of server 110 may execute server program 115 to provide access to shared environment 120. As shown in FIG. 1, shared environment 120 includes objects 125a-125c, which may represent avatars, vehicles, or other representations of clients 140a-140c, respectively. Clients 140a-140c may each comprise, for example, a desktop or laptop computer, a game console, a mobile phone, a portable media player, or any other device capable of connecting to server 110 via network 130 and outputting video to displays 150a-150c, respectively. For example, as shown in FIG. 1, each of clients 140a-140c may be executing respective client programs 145a-145c using respective processors 141a-141c. Client programs 145a-145c may comprise, for example, a client program or a web browser that accesses and interfaces with server program 115 running on server 110. Clients 140a-140c may then render shared environment 120 including objects 125a-125c for output on displays 150a-150c, which is observable by the users of clients 140a-140c.

Although only one server and three clients are depicted in FIG. 1, alternative embodiments may use several servers and support many more than three clients concurrently. Multiple servers may be provided for load balancing, optimum network locality, redundancy, and other reasons, whereas many clients may be connected concurrently to support massively multi-player online (MMO) gameplay. However, for reasons of clarity and simplicity, the network configuration shown in FIG. 1 shall be adopted for explanatory purposes.

Figure 2:
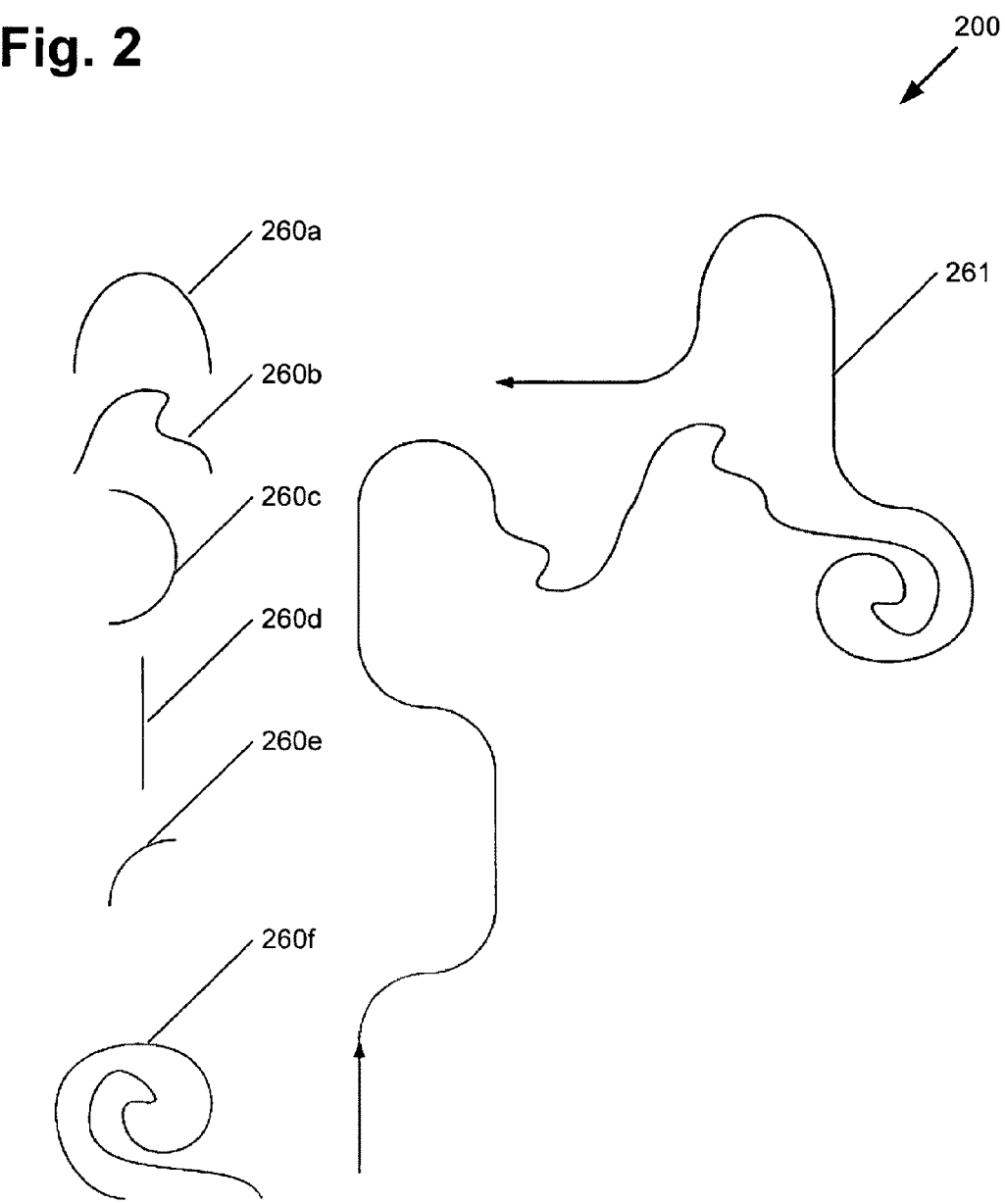
FIG. 2 presents exemplary unitized maneuvers, individually and in combination, according to one embodiment of the present invention.

FIG. 2 presents exemplary unitized maneuvers, individually and in combination, according to one embodiment of the present invention. Diagram 200 of FIG. 2 includes unitized maneuvers 260a-260f and composite maneuver 261.

The unitized maneuvers 260a-260f may, for example, comprise a possible selection of discrete vehicle maneuvers for an online racing game. Once a user initiates a unitized maneuver on an object or vehicle, it will automatically and deterministically follow the path of the unitized maneuver without any further input from the user. As shown in FIG. 2, unitized maneuver 260a is a half ellipsis, unitized maneuver 260b is a parametric curve such as a Bezier curve, 260c is a half circle, 260d is a straight line segment, 260e is an arc, and 260f is a spiral. Composite maneuver 261 is comprised of unitized maneuvers 260a-260f arranged successively in a particular order, forming one long vehicle path.

Unitized maneuvers may be represented by a plurality of parameters, such as a start time, a start position, a start direction vector, and a movement path. If a constant velocity is not used, then the plurality of parameters might further include a starting acceleration or deceleration. The movement path might be described using a movement equation and one or more parameters. For example, unitized maneuver 260c may be defined as a movement equation for a half circle with a defined radius. More complicated paths such as unitized maneuver 260b or 260f may be defined as a series of Bezier curves forming the desired path shapes, as is well known in the art.

Thus, in the online racing game utilizing unitized maneuvers 260a-260f, a server may receive a selection of unitized maneuvers from the user to form a complex composite maneuver for controlling an object or vehicle. This contrasts to the traditional input approach, where the server may constantly poll for lower level control actions such as steering and acceleration. In other words, a level of fine-grained control is sacrificed by limiting user input to discrete unitized maneuvers. However, at the same time, a user can trigger more complicated maneuver paths such as spirals, S-shaped curves, Bezier curves, and sinusoidal jumps effortlessly from input devices such as keyboards or joysticks. For example, unitized maneuvers 260a-260f may each be assigned to keys Q, W, E, R, T, and Y of a keyboard, respectively, allowing the user to initiate complex and dramatic movements with a simple key press, movements that may be difficult to accomplish even with the benefit of a traditional input approach providing fine grained object or vehicle control. In this manner, users are empowered to execute complex strings of cinematic movements with minimal required effort and practice.

Moreover, since the movement parameters of each unitized maneuver are provided, servers and other clients can determine the exact path that a vehicle or object takes once a particular unitized maneuver is initiated at a particular start time. Thus, servers or other clients can also determine a final position and a final direction vector after a particular unitized maneuver finishes by performing calculations using the movement parameters to simulate the progress of an object or vehicle undergoing the particular unitized maneuver. Furthermore, an end time after the start time can also be deterministically calculated using a similar simulation approach. If these final results are also applicable for other situations and objects, caching and look-up tables may be used for faster retrieval. In this manner, servers and other clients can determine guaranteed accurate future movements of a particular client's object or vehicle if it is known to be progressing through a particular unitized maneuver. Thus, synchronization of client states can be deferred while maintaining accurate interpolation of client positions, avoiding the distortions typically associated with traditional latency compensation algorithms. As a result, users can be assured a more consistent and enjoyable game experience by minimization of errors induced through network latency.

Figure 3:
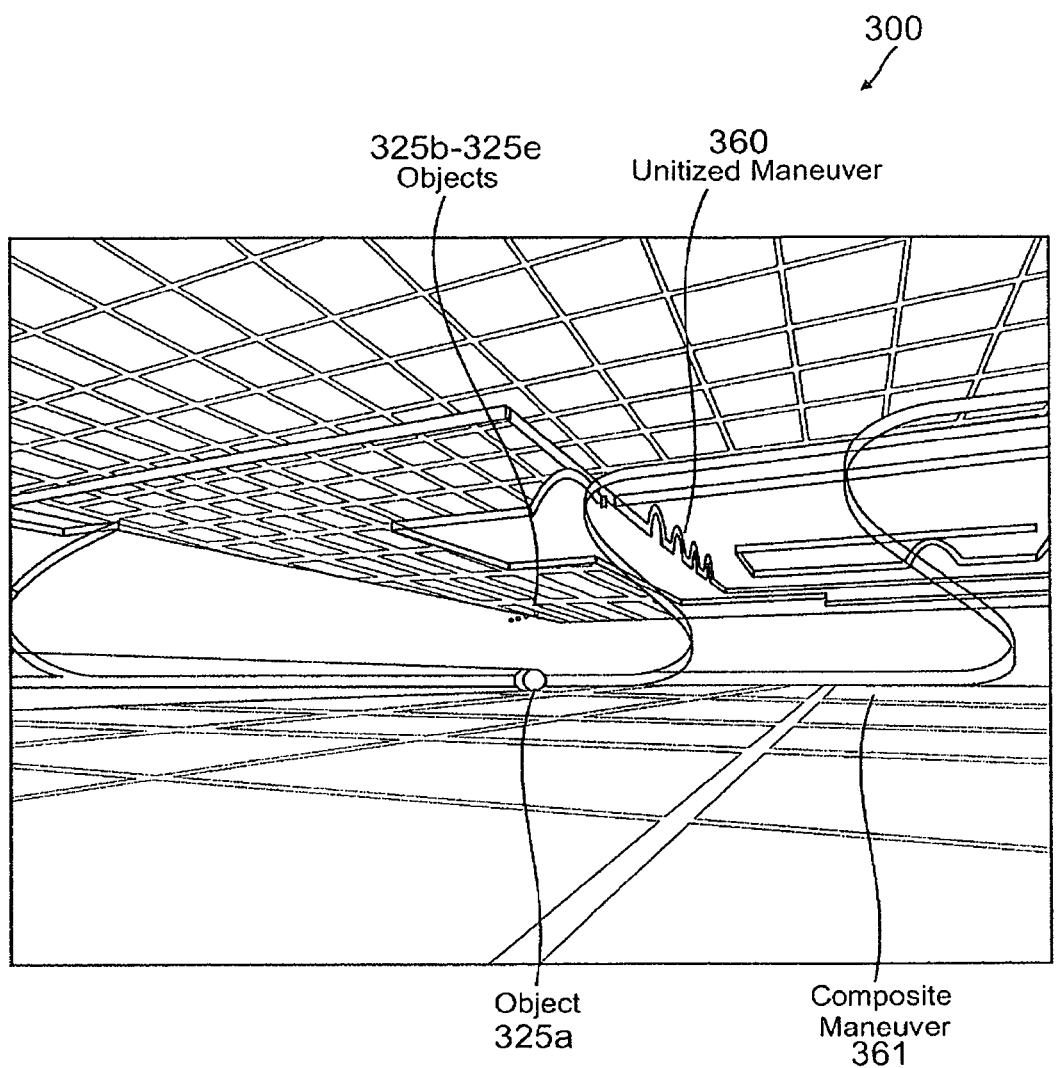
FIG. 3 presents an example display showing a rendering of a shared environment using unitized maneuvers, according to one embodiment of the present invention.

FIG. 3 presents an example display showing a rendering of a shared environment using unitized maneuvers, according to one embodiment of the present invention. Display 300 of FIG. 3 includes objects 325a and 325b-325e, unitized maneuver 360, and composite maneuver 361.

FIG. 3 shows an example three-dimensional rendering of the online racing game as rendered by a particular client, such as a client corresponding to client 140a of FIG. 1, and then output to display 300, which may correspond to display 150a of FIG. 1. Object 325a may correspond to a vehicle controlled by a user of the client. Objects 325b-325e may then represent four other vehicles controlled by users of other clients. Some portion of objects 325b-325e might also be computer controlled through artificial intelligence. A goal of the online racing game shown in display 300 may be for object 325a to generate a trailing path, or composite maneuver 361, to act as a barrier for rival vehicles, or objects 325b-325e as seen in the distance. As shown by unitized maneuver 360 comprising sinusoidal jumps, the user controlling object 325a can build composite maneuver 361 using complex unitized maneuvers that may be difficult or impossible for a user to input using traditional control schemes. In this manner, the adaptation of stylized, fantastic, and futuristic world settings may be facilitated for use in practical interactive video game concepts.

Figure 4:
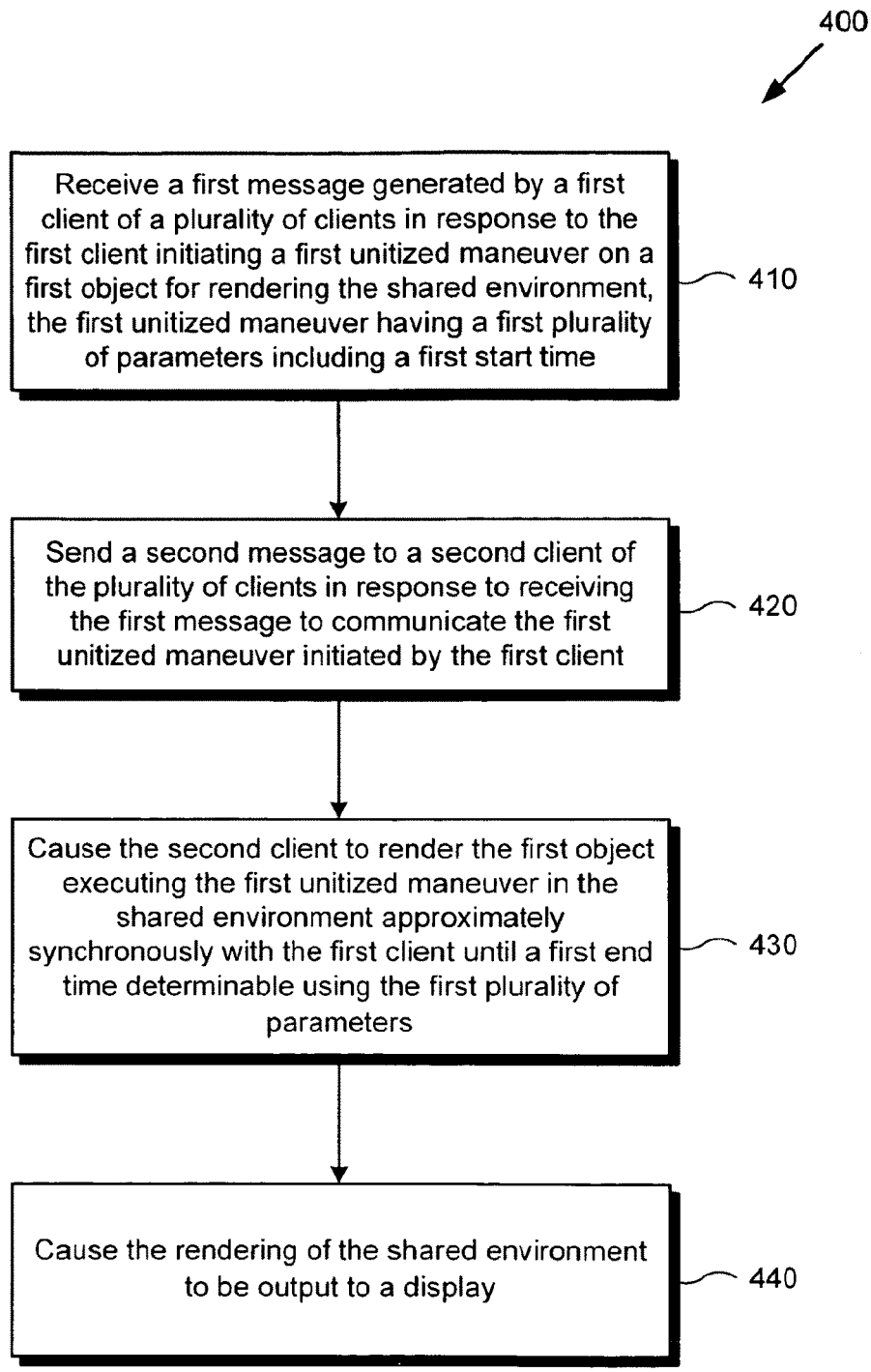
FIG. 4 shows a flowchart describing the steps, according to one embodiment of the present invention, by which a processor of a server can facilitate unitized maneuvers for a shared environment.

FIG. 4 shows a flowchart describing the steps, according to one embodiment of the present invention, by which a processor of a server can facilitate unitized maneuvers for a shared environment. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and diagram 100 of FIG. 1, step 410 of flowchart 400 comprises processor 111 of server 110 receiving a first message generated by client 140a in response to client 140a initiating a first unitized maneuver on object 125a for rendering shared environment 120, the first unitized maneuver having a plurality of parameters including a first start time. For example, client program 145a may detect an appropriate user input from an attached input device, such as a mouse click or a key or button press, to trigger the selection of the first unitized maneuver. The plurality of parameters might include, for example, that a maneuver defined by unitized maneuver 260c, or a half circle, is to be executed by object 125a using a radius of 10 meters at a start time T1, a start position P1, and a start direction vector heading northbound at a velocity V1. For simplicity, a two-dimensional shared environment 120 may be assumed. Based on a calculation using this plurality of parameters and possibly course data from shared environment 120, it may be determined that an end time T2 will occur 0.5 seconds after start time T1. This determination of end time T2 along with the plurality of parameters for the first unitized maneuver may be included in the first message of step 410, which may then be sent over network 130 for receiving by server 110. Meanwhile, client program 145a may initiate the rendering of shared environment 120 using the first unitized maneuver for output to display 150a.

Referring to step 420 of flowchart 400 in FIG. 4 and diagram 100 of FIG. 1, step 420 of flowchart 400 comprises processor 111 of server 110 sending a second message to client 140b in response to step 410 to communicate the first unitized maneuver initiated by client 140a. As previously discussed, network 130 may introduce some unavoidable latency, causing the second message of step 420 to arrive at client 140b eventually with some time delay, for example 0.2 seconds. Using the information contained in the first message provided in step 410, client program 145b of client 140b can determine that the first maneuver started 0.2 seconds ago and is scheduled to finish 0.3 seconds from the present time. Given this forward-looking information, client program 145b can accurately render the progress of object 125a in shared environment 120 for at least the next 0.3 seconds, providing at least 0.3 seconds of buffer time until resynchronization with client 140a is required to maintain accurate synchronization. By using network diagnostics to test network latency, it may be possible to calibrate the average duration of unitized maneuvers to exceed the average duration of network latency, thereby facilitating a consistent, accurate, and synchronized multi-player game experience even in the face of network latency.

Referring to step 430 of flowchart 400 in FIG. 4 and diagram 100 of FIG. 1, step 430 of flowchart 400 comprises processor 111 of server 110 causing client 140b to render object 125a executing the first unitized maneuver in shared environment 120 approximately synchronously with client 140a until end time T2, which was previously determined by client 140a in step 410 but may also be determined by server 110 as part of the second message in step 420 or by client 140b as part of step 430. For example, server program 115 may instruct client program 145b to also render shared environment 120 including the first unitized maneuver on object 125a. Client program 145b may then render object 125a in shared environment 120 by applying the first unitized maneuver. As previously discussed, client program 145b of client 140b may receive the second message 0.2 seconds later than start time T1, which may be compensated for by moving object 125a to the properly calculated position before rendering. This may cause object 125a to suddenly jerk into position, but maintaining accurate synchronization might be prioritized over smooth movement in this instance.

To avoid instances of jerky movements due to network latency as described above in step 430, users might be allowed to queue one or more future unitized maneuvers during the present execution of a unitized maneuver. Thus, for example, prior to end time T2, a user of client 140a might queue a second unitized maneuver having a second start time T3 on or after end time T2 and ending at second end time T4, using a process similar to step 410 above. Since a third message regarding the second unitized maneuver may be broadcast even before second start time T3 begins, network latency may be mitigated. As a result, a fourth message may be broadcast prior to second start time T3, allowing client 140b to begin rendering object 125a executing the second unitized maneuver perfectly synchronized and right on time at second start time T3 until second end time T4. Using this technique in succession, a long chain of unitized maneuvers may be prepared and broadcast in advance to server 110 and other clients, further reducing the risk of negative effects resulting from network latency such as jerky movements.

Referring to step 440 of flowchart 400 in FIG. 4 and diagram 100 of FIG. 1, step 440 of flowchart 400 comprises processor 111 of server 110 causing the rendering of shared environment 120 in step 430 to be output to display 150b. For example, server program 115 may instruct client program 145b to also output the results of the rendering from step 430 to an attached display, or display 150b in FIG. 1. Client program 145b may then output the rendering to display 150b, using methods as commonly known in the art.

While the steps above have been discussed in regards to clients 140a and 140b only, the steps may also be easily repeated to accommodate additional clients such as client 140c for supporting large multi-player games. In this manner, fluid and accurate rendering of objects in a multi-player game can be achieved in spite of network latency.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A server facilitating unitized maneuvers for a shared environment, the server comprising:
   a processor configured to:
      receive a first message generated by a first client of a plurality of clients in response to the first client initiating a first unitized maneuver on a first object for rendering the shared environment and prior to the first client ending the first unitized maneuver, the first unitized maneuver selected from a selection of discrete unitized maneuvers and having a first plurality of parameters including a first start time; and
      send a second message to a second client of the plurality of clients in response to receiving the first message to communicate the first unitized maneuver initiated by the first client, so as to cause the second client to render the first object executing the first unitized maneuver in the shared environment approximately synchronously with the first client until a first end time determinable using the first plurality of parameters.

2. The server of claim 1, wherein the first plurality of parameters further include a start position, a start direction vector, and a movement path.

3. The server of claim 2, wherein the movement path defines one of an arc, a sinusoidal jump, a S-shaped curve, a Bezier curve, or a spiral.

4. The server of claim 2, wherein the movement path is defined using a movement equation and at least one parameter for the movement equation.

5. The server of claim 2, wherein the first plurality of parameters further includes a starting acceleration or deceleration.

6. The server of claim 1, wherein the processor is further configured to:
receive a third message prior to the first end time, the third message generated by the first client in response to the first client initiating a second unitized maneuver on the first object for rendering the shared environment, the second unitized maneuver having a second plurality of parameters including a second start time on or after the first end time; and
send a fourth message prior to the second start time to the second client in response to receiving the third message to communicate the second unitized maneuver initiated by the first client, so as to cause the second client to render the first object executing the second unitized maneuver in the shared environment approximately synchronously with the first client starting at the second start time until a second end time determinable using the second plurality of parameters.

7. The server of claim 1, wherein the rendering of the shared environment is further output to a display.

8. The server of claim 1, wherein a user of the first client triggers an input device of the first client to cause the initiating of the first unitized maneuver.

9. The server of claim 1, wherein a final position and a final direction vector are further determinable using the first plurality of parameters.

10. A method for use by a processor of a server for facilitating unitized maneuvers for a shared environment, the method comprising:
receiving a first message generated by a first client of a plurality of clients in response to the first client initiating a first unitized maneuver on a first object for rendering the shared environment and prior to the first client ending the first unitized maneuver, the first unitized maneuver selected from a selection of discrete unitized maneuvers and having a first plurality of parameters including a first start time; and
sending a second message to a second client of the plurality of clients in response to receiving the first message to communicate the first unitized maneuver initiated by the first client, so as to cause the second client to render the first object executing the first unitized maneuver in the shared environment approximately synchronously with the first client until a first end time determinable using the first plurality of parameters.

11. The method of claim 10, wherein the first plurality of parameters further include a start position, a start direction vector, and a movement path.

12. The method of claim 11, wherein the movement path defines one of an arc, a sinusoidal jump, a S-shaped curve, a Bezier curve, or a spiral.

13. The method of claim 11, wherein the movement path is defined using a movement equation and at least one parameter for the movement equation.

14. The method of claim 10 further comprising:
receiving a third message prior to the first end time, the third message generated by the first client in response to the first client initiating a second unitized maneuver on the first object for rendering the shared environment, the second unitized maneuver having a second plurality of parameters including a second start time on or after the first end time; and
sending a fourth message prior to the second start time to the second client in response to receiving the third message to communicate the second unitized maneuver initiated by the first client, so as to cause the second client to render the first object executing the second unitized maneuver in the shared environment approximately synchronously with the first client starting at the second start time until a second end time determinable using the second plurality of parameters.

15. The method of claim 10, wherein the first message generated by the first client is in response to a single input by the first client.

16. The method of claim 10, wherein a user of the first client triggers an input device of the first client to cause the initiating of the first unitized maneuver.

17. The method of claim 10, wherein a final position and a final direction vector are further determinable using the first plurality of parameters.

18. A client device for initiating unitized maneuvers in a shared environment, the client device comprising:
a display;
a processor configured to:
receive the shared environment from a server communicating with a plurality of client devices;
render the shared environment on the display;
receive a first request from a user to initiate a first unitized maneuver on a first object for rendering the shared environment on the display and for the plurality of client devices and prior to the client device ending the first unitized maneuver, the first unitized maneuver selected from a selection of discrete unitized maneuvers and having a first plurality of parameters including a first start time;
continue rendering the shared environment on the display in accordance with the first object executing the first unitized maneuver until a first end time determinable using the first plurality of parameters; and
send a first message to the server in response to the first request, wherein the first message includes the first unitized maneuver so as to cause other of the plurality of client devices to render the shared environment approximately synchronously in accordance with the first object executing the first unitized maneuver until the first end time.

19. The client device of claim 18, wherein the processor is further configured to:
receive a second request from the user prior to the first end time to initiate a second unitized maneuver on the first object for rendering the shared environment on the display and for the plurality of client devices, the second unitized maneuver having a second plurality of parameters including a second start time on or after the first end time;
send a second message prior to the second start time to the server in response to the second request so as to cause the other of the plurality of client devices to render the shared environment approximately synchronously in accordance with the first object executing the second unitized maneuver starting at the second start time until a second end time determinable using the second plurality of parameters; and continue rendering the shared environment on the display in accordance with the first object executing the second unitized maneuver starting at the second start time until the second end time.

20. The client device of claim 18, wherein the first plurality of parameters further include a start position, a start direction vector, and a movement path.

\* \* \* \* \*